US011757654B2

(12) United States Patent
Eliezer

(10) Patent No.: US 11,757,654 B2
(45) Date of Patent: Sep. 12, 2023

(54) METHOD AND SYSTEM FOR FACILITATING ELECTRONIC WITNESSING OF ELECTRONIC SIGNATURES

(71) Applicant: Yuri L. Eliezer, Atlanta, GA (US)

(72) Inventor: Yuri L. Eliezer, Atlanta, GA (US)

(73) Assignee: Yuri L. Eliezer, Atlanta, GA (US)

( * ) Notice: Subject to any disclaimer, the term of this patent is extended or adjusted under 35 U.S.C. 154(b) by 0 days.

(21) Appl. No.: 17/486,874

(22) Filed: Sep. 27, 2021

(65) Prior Publication Data

US 2022/0014385 A1 Jan. 13, 2022

Related U.S. Application Data

(63) Continuation of application No. 16/083,834, filed as application No. PCT/US2017/031489 on May 8, 2017, now Pat. No. 11,133,937.

(60) Provisional application No. 62/305,269, filed on Mar. 8, 2016.

(51) Int. Cl.
| | |
|---|---|
| *H04L 9/32* | (2006.01) |
| *G06K 19/06* | (2006.01) |
| *H04L 9/40* | (2022.01) |
| *G06F 21/64* | (2013.01) |
| *G06F 21/10* | (2013.01) |

(52) U.S. Cl.
CPC ............ *H04L 9/3247* (2013.01); *G06F 21/64* (2013.01); *G06F 21/645* (2013.01); *G06K 19/06037* (2013.01); *H04L 63/0861* (2013.01); *H04L 63/126* (2013.01); *G06F 21/10* (2013.01)

(58) Field of Classification Search
CPC ......... H04L 9/3247; H04L 9/32; H04L 9/321; H04L 9/3231; H04L 63/0861; H04L 63/08; H04L 63/126; H04L 63/083; H04L 63/0823; H04L 63/123; H04L 63/12; G06F 21/645; G06F 21/6209; G06F 21/64; G06F 21/62; G06F 21/10; G06K 19/06037

See application file for complete search history.

(56) References Cited

U.S. PATENT DOCUMENTS

| | | | |
|---|---|---|---|
| 5,872,848 A | 2/1999 | Romney et al. | |
| 7,734,925 B2 * | 6/2010 | Ross .................. | G06Q 20/02 713/178 |
| 9,166,986 B1 | 10/2015 | Saylor et al. | |
| 9,660,995 B2 | 5/2017 | Reiter et al. | |
| 11,133,937 B2 | 9/2021 | Eliezer | |
| 2003/0177360 A1 | 9/2003 | Carmichael et al. | |

(Continued)

OTHER PUBLICATIONS

International Search Report and Written Opinion dated Aug. 7, 2017 cited in Application No. PCT/US2017/031489, 8 pgs.

*Primary Examiner* — Shaqueal D Wade-Wright
(74) *Attorney, Agent, or Firm* — BEKIARES ELIEZER LLP

(57) ABSTRACT

Disclosed is a method of witnessing electronic signing of a document. The method may include identifying an eligible witness device from a signature request. Furthermore, the witness electronic device may be configured to verify the signor electronic device before making a document available to a signor electronic device based on a witness action from the witness electronic device. Additionally, the method may include transmitting the document to the signor electronic device upon verification of the signor electronic device. Furthermore, the signed document may include the electronic signature of the signor.

19 Claims, 8 Drawing Sheets

(56) References Cited

U.S. PATENT DOCUMENTS

| | | | |
|---|---|---|---|
| 2013/0160102 A1* | 6/2013 | Decara | H04L 63/083 |
| | | | 726/7 |
| 2013/0190841 A1 | 7/2013 | McMillan | |
| 2013/0325728 A1* | 12/2013 | Bialostok | G06Q 10/06 |
| | | | 705/311 |
| 2015/0317643 A1 | 11/2015 | Mian et al. | |
| 2016/0048696 A1 | 2/2016 | Follis | |
| 2016/0335479 A1 | 11/2016 | Bartlett, II et al. | |
| 2019/0036707 A1 | 1/2019 | Eliezer | |

* cited by examiner

600

602 — RECEIVE, USING THE COMMUNICATION INTERFACE, A SIGNER ID CONFIRMATION FROM A WITNESS ELECTRONIC DEVICE ASSOCIATED WITH A WITNESS, WHEREIN THE SIGNER ID CONFIRMATION IS PROVIDED BY THE WITNESS, WHEREIN THE SIGNER ID CONFIRMATION IS BASED ON A FIRST VISUAL CODE PRESENTED ON A SIGNER ELECTRONIC DEVICE ASSOCIATED WITH THE SIGNER, WHEREIN THE WITNESS ELECTRONIC DEVICE IS CONFIGURED TO RECEIVE THE FIRST VISUAL CODE BASED ON AN INTERACTION BETWEEN THE SIGNER ELECTRONIC DEVICE AND THE WITNESS ELECTRONIC DEVICE

604 — RECEIVE, USING THE COMMUNICATION INTERFACE, A SIGNATURE CONFIRMATION FROM THE WITNESS ELECTRONIC DEVICE ASSOCIATED WITH A WITNESS, WHEREIN THE SIGNATURE CONFIRMATION IS PROVIDED BY THE WITNESS, WHEREIN THE SIGNATURE CONFIRMATION IS BASED ON A SECOND VISUAL CODE PRESENTED ON THE SIGNER ELECTRONIC DEVICE, WHEREIN THE WITNESS ELECTRONIC DEVICE IS CONFIGURED TO RECEIVE THE SECOND VISUAL CODE BASED ON AN INTERACTION BETWEEN THE SIGNER ELECTRONIC DEVICE AND THE WITNESS ELECTRONIC DEVICE USING THE COMMUNICATION INTERFACE, THE CATEGORY FROM THE CLIENT DEVICE

606 — ESTABLISH, USING A PROCESSOR, WITNESSING OF ELECTRONIC SIGNING OF THE DOCUMENT BY THE SIGNER BASED ON RECEIPT OF EACH OF THE SIGNER ID CONFIRMATION AND THE SIGNATURE CONFIRMATION

FIG. 6

METHOD AND SYSTEM FOR FACILITATING ELECTRONIC WITNESSING OF ELECTRONIC SIGNATURES

RELATED APPLICATIONS

This application is a continuation of U.S. application Ser. No. 16/083,834 filed on Sep. 10, 2018, which issues on Sep. 28, 2021 as U.S. Pat. No. 11,133,937, which claims benefit under 35 U.S.C. § 371 of International Application No. PCT/US2017/031489 filed on May 8, 2017, which claims benefit under the provisions of 35 U.S.C. § 119(e) of U.S. Provisional Application No. 62/305,269 filed on Mar. 8, 2016, which are incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF DISCLOSURE

The present disclosure generally relates to electronic signature processes and technology. More specifically, the disclosure relates to a method and system for facilitating electronic witnessing of electronic signatures.

BACKGROUND

In some situations, it may be necessary to witness or notarize the signing of a document. The witness or notary may be able to confirm and validate the authenticity of a signature on a document as belonging to the signor. The conventional strategy is to have a witness or notary view the signature process and the sign the document themselves, indicating that they witness the signing and would be prepared to testify as to the same. However, with the advent of electronic signature technology, the mechanics by which a witness can view and attest to the electronic signature process are yet to be developed.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

A method of facilitating electronic signing of a document may be provided. The method may include receiving, using a communication interface, a signature access request from a signor electronic device associated with a signor. Further, the method may include receiving, using the communication interface, a first confirmation from a witness electronic device associated with a witness. The first confirmation may be provided by the witness. Further, the method may include making available the document to the signor electronic device based on the first confirmation. The document may be made available via a transmission of the document that may occur either before or after the first confirmation. Furthermore, the signor electronic device may be configured to present the document to the signor and receive an electronic signature from the signor. Further, the method may include receiving, using the communication interface, a second confirmation from the witness electronic device. The second confirmation may be provided by the witness. Further, the method may include receiving, using the communication interface, a signed document from the signor electronic device. Furthermore, the signed document may include the electronic signature of the signor. Additionally, the electronic signature may be validated based on receipt of each of the first confirmation and the second confirmation.

Also provided is a method of facilitating witnessing of electronic signing of a document by a signor. The method may include receiving, using the communication interface, a first confirmation from a witness electronic device associated with a witness. The first confirmation may be provided by the witness electronic device. Further, the first confirmation may be based on a first code associated with at least one of the following: a signor electronic device and the signor. Furthermore, the witness electronic device may be configured to receive the first code based on an interaction between the signor electronic device and the witness electronic device. Other triggers of the first confirmation may be associated with, for example, proximity between the signor device and the witness device, an interaction between the devices using a communication medium of limited range, and other location-based methods that may be employed (e.g., geo-fencing).

Additionally, the method may include receiving, using the communication interface, a second confirmation from the witness electronic device associated with a witness. The second confirmation may be provided by the witness. Further, the second confirmation may be based on a second code presented on the signor electronic device. Furthermore, the witness electronic device may be configured to receive the second code based on an interaction between the signor electronic device and the witness electronic device. Additionally, the method may include establishing, using a processor, witnessing of electronic signing of the document by the signor based on receipt of each of the first confirmation and the second confirmation.

Further provided, is a system for facilitating electronic signing of a document. The system may include a communication interface configured to receive a signature access request from a signor electronic device associated with a signor. Further, the communication interface may be configured to receive a first confirmation from a witness electronic device associated with a witness. Furthermore, the first confirmation may be provided by the witness. Further, the communication interface may be configured to transmit the document to the signor electronic device based on the first confirmation. Additionally, the signor electronic device may be configured to present the document to the signor and receive an electronic signature from the signor. Further, the communication interface may be configured to receive a second confirmation from the witness electronic device. Furthermore, the second confirmation may be provided by the witness. Further, the communication interface may be configured to receive a signed document from the signor electronic device. Additionally, the signed document may include the electronic signature of the signor. Further, the electronic signature may be validated based on receipt of each of the first confirmation and the second confirmation.

Further provided, is a system of facilitating witnessing of electronic signing of a document. The system may include a communication interface configured to receive a first confirmation from a witness electronic device associated with a witness. Further, the first confirmation may be provided by the witness. Furthermore, the first confirmation may be based on a first code presented on a signor electronic device.

Additionally, the witness electronic device may be configured to receive the first code based on an interaction between the signor electronic device and the witness electronic device. Further, the communication interface may be configured to receive a second confirmation from the witness electronic device associated with a witness. Furthermore, the second confirmation may be provided by the witness. Moreover, the second confirmation may be based on a second code presented on the signor electronic device. Further, the witness electronic device may be configured to receive the second code based on an interaction between the signor electronic device and the witness electronic device. Additionally, the system may include a processor configured to establish witnessing of electronic signing of the document by the signor based on receipt of each of the first confirmation and the second confirmation.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 6 illustrates a flowchart of a method of facilitating witnessing of electronic signing of an electronic document, in accordance with some embodiments.

DETAILED DESCRIPTION

Figure 1:
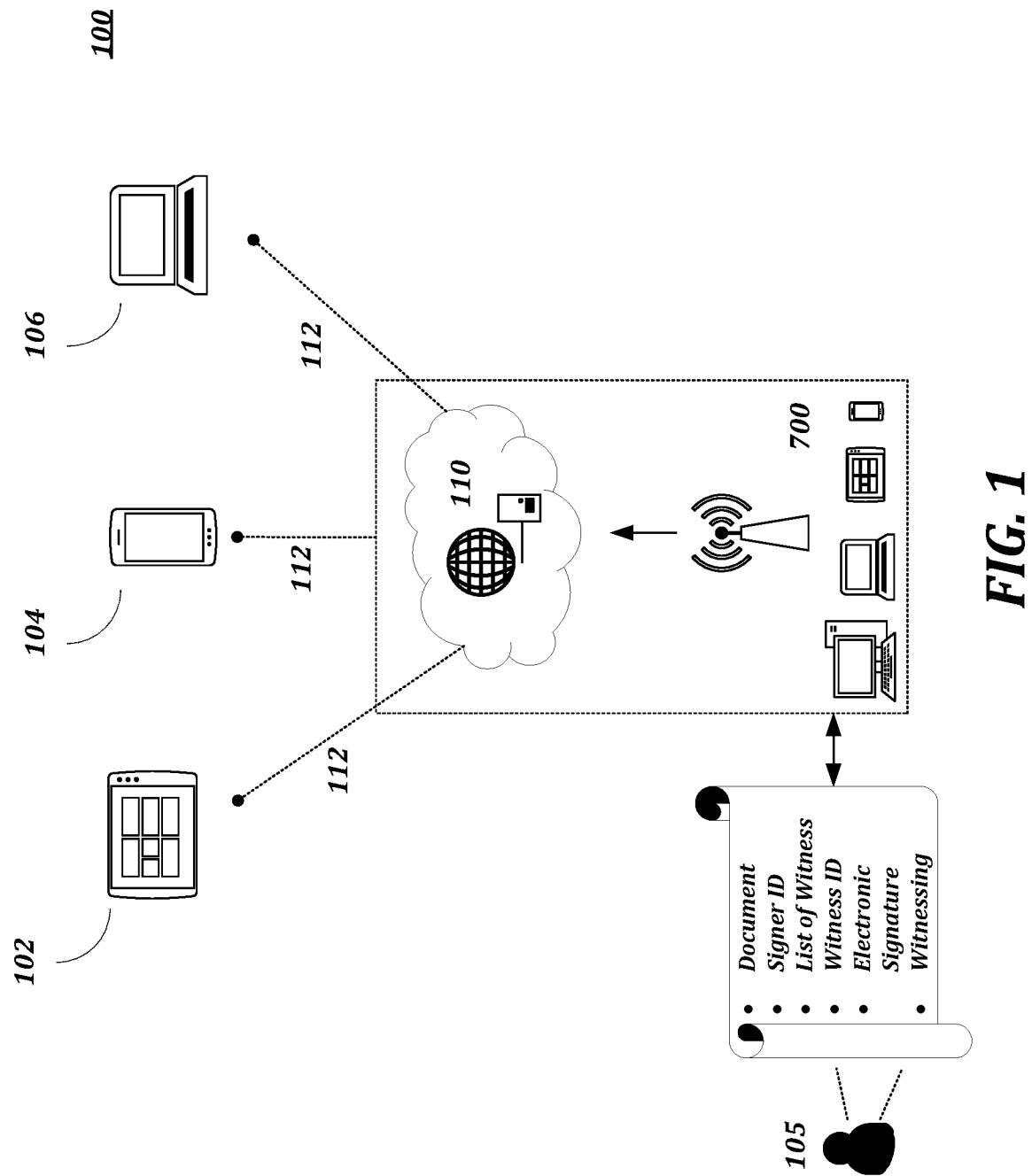
FIG. 1 illustrates a block diagram of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of a signor electronic device and a witness electronic device, embodiments of the present disclosure are not limited to use only in this context. For example, various embodiments disclosed herein may be combined to adapt for an environment in which a single electronic device is operated by both the witness and the signor.

I. Platform Overview

Consistent with embodiments of the present disclosure, an electronic signature platform (also referred to herein as "platform" or E-Signature platform) for facilitating witnessing of electronic signing may be provided. This overview is provided to introduce a selection of concepts in a simplified form that are further described below. This overview is not intended to identify key features or essential features of the claimed subject matter. Nor is this overview intended to be used to limit the claimed subject matter's scope. The online platform may be used by individuals or companies to facilitate electronic signing and witnessing of electronic signing of electronic documents.

Embodiments described herein provide an electronic signature platform that is configured to 1) enable a requester or a signor of an electronic document to specify a witness, 2) determine that the witness is in the proximity of the signor and can view the signing of the electronic document, and 3) generate an audit trail to record and capture the data from both the witness and the signor.

Accordingly, the E-Signature platform may be configured to be accessible by a plurality of parties, including, but not limited to, a signor, a witness and a requester of electronic signing. Initially, the requester may send a Signature Request for a document to be signed by the signor through the E-Signature Platform. Accordingly, the signor may receive a link corresponding to the document. Upon activating the link, the E-Signature platform may initiate a signature process. Similarly, the witness may also receive a link and upon activating the link, the E-Signature platform may initiate a witnessing process. Once the signing process and the witnessing process are performed, the E-Signature platform retains a copy of the signed document and all parties get notifications, a copy of the signed document and an audit trail corresponding to the signature process and the witnessing process.

The signature process includes a first stage of access and authentication. Accordingly, when the signor clicks the link provide by the E-signature platform, the signor may arrive at a unique URL (webpage, Web-app, or mobile-app) associated with the document to be signed. Subsequently, the audit trail may begin. Further, optionally, the signor's ID may be verified.

Further, at a second stage, the signature process may include a first witness action. Accordingly, if a witness ID is defined (e.g., who specifically must witness the document), a first QR code pops up and remains on the signor electronic device until a Witnessing Process Level 1 Verification is completed. In an instance, the requester, during the signature request process, may identify who the witness should be by specifying the witness ID. Alternatively, if the witness ID is not defined, but required by the requester, the requester, during the signature request process, may not define who the witness should be but enable the signor to specify who the witness should be. In this event, an Invite a Witness Process begins. Upon completion of the Invite a Witness Process, the first QR code pops up and remains on the signor electronic device until Witnessing Process Level 1 Verification is completed.

Further, in a third stage, the signature process may include document execution. Accordingly, when the E-Signature platform receives a notification that the Witnessing Process Level 1 Verification is completed, the signor may be presented with the document to sign electronically. Subsequently, an E-Signature may be received from the signor. Once the signor's signature is received, and the signor hits a "Submit" button, electronic signing of the document may be completed.

Further, in a fourth stage, the signature process may include a second witness action. Prior to final completion and acceptance of the electronic signature, the E-Signature platform may present (on the signor electronic device) a second QR code, which remains there until a Witnessing Process Level 2 Verification is completed. In some embodiments, the Witnessing Process Level 2 Verification and the second QR code may be combined with Witnessing Process Level 1 Verification and presented at either the beginning or the end. So, the second stage and the fourth stage may be a single stage.

Further, in a fifth stage, the signature process may include receiving a notification, the E-Signature platform, that the Witnessing Process Level 2 Verification is completed. Upon receipt of the notification, the signature process may be completed.

Further, initiation of the witnessing process may take place based on the witness clicking the link provided by the E-Signature platform on the witness electronic device. Accordingly, when the witness clicks the link, the witness may arrive at a unique URL (webpage, Web-app, or mobile-app) associated with the document. Subsequently, the audit trail may be updated. Further, optionally, a witness ID corresponding to the witness may be verified. Subsequently, if a proximity rule is defined, the proximity rule may be checked. Accordingly, if the proximity rule is verified, the witness electronic device may load a QR Code Scanner. Accordingly, the witness electronic device may scan the QR code displayed on the signor electronic device using the witness electronic device. Further, the QR code may determine which phase of witnessing verification will begin. For example, if QR code is a first QR Code, Witnessing Process Level 1 Verification may begin. If the QR code is a second QR Code, Witnessing Process Level 1 Verification may begin.

In the Witnessing Process Level 1 Verification, the E-Signature platform may provide the witness electronic device with document ID details corresponding to the document based on data obtained or made accessible via the first QR code. Further, the document ID details may include one or more of a copy of the document, a copy of signor credentials, and a copy of requester information. Furthermore, the witness may be enabled to take a picture of the signor to confirm the signor ID. Additionally, the witness may also be enabled to capture biometrics of the signor. Additionally, the witness may be enabled to take a picture of the signor's ID card to confirm the signor ID. Accordingly, the witness electronic device may include a feature of automatic ID Card scanning. Alternatively, the witness may simply click a button labeled "I have confirmed the signor ID".

In the Witnessing Process Level 2 Verification, the E-Signature platform may provide the witness electronic device with document ID details of the document based on data obtained or made accessible via the second QR code. Further, the document ID details may include a copy of the signature, a copy of ID details and a copy of the signed document. Further, the witness may simply click or check a box "I have confirmed the signor ID", and/or "I have witnessed the signature".

E-Signature platform: An E-Signature platform may be the platform on which a document may be communicated, reviewed, filled-in (the in case of fill-in-the-blank forms/templates), and signed electronically.

Document: Document may refer to any electronic document, including but not limited to a pdf, doc, template, form, and the like.

Document details: Document details may refer to all credentials associated with the document (signors, signor emails, witness, witness emails, access data, audit trail data, expiration data, view data, reminder data, communication data, and the like).

Unique URL: A unique URL may lead to the document stored at a centralized and secure location. The platform may be embodied as a website, web-app, software application, mobile application, or any other software/hardware combination.

Audit trail: The audit trail keeps track of all user activity and user ID data on the E-Signature platform. For instance, during a security phase, the audit trail may capture pin code, role of party (i.e., signor/witness/CC/approving party etc.), biometrics and ID Card verification. Further, during a tracking phase, the audit trail may capture access data relating to the unique URL such as, IP address and Time/Date of access, document ID details and ID Verification, which may include photos/scans/biometrics data. Based on the above, the audit trail may be employed for each access to the unique URL associated with the document and provided to all parties.

Proximity Witnessing Requirement: The Requester may define a proximity rule during the signature request. If the proximity rule is active, the E-Signature platform may audit whether or not the witness is in physical proximity of the signor. If proximity is required, during the signature process the E-Signature Platform may determine whether the GPS location of witness electronic device is in an appropriate proximity to the signor electronic device. Alternatively, the E-Signature platform may determine whether the Wi-Fi Location/IP Address of the signor electronic device match those of the witness electronic device. Alternatively, the E-Signature platform may determine the proximity based on a Bluetooth connection or any other form of near-field communication between the witness electronic device and the signor electronic device.

However, when the proximity rule is not required, and when the witness may be remote from the signor, then a screen sharing session may be initiated between the signor and the witness. The witness may access the same URL it would have otherwise, go through the same ID verification steps, and view the signing of the document as the signor executes the document via the screen sharing technology. In some embodiments, a webcam may be used to enable the witness to verify the signor ID of the signor. All of this may be recorded and saved as part of the audit trail (the entire screen sharing/webcam session).

Invite a witness process: If the requester requires the document to be witnessed, but gives the freedom for the signor to choose who they want the witness to be, the signor may be presented with an interface to specify a name of the witness, an email address of the witness and a pass code for use by the Witness. Further, in some embodiments, the signor may choose from a list of approved or certified witnesses (e.g., notaries). The list may be provided by either the requester or the E-Signature platform.

Requester: The requester is a user of the E-Signature Platform who defines which documents need to be signed, who needs to sign those documents, and who needs to witness the signing of those documents. Each signor may have its own witness. The witness may be predefined by the requester, or the signor can select their own witness (see Invite a witness process).

QR code: A QR Code can refer to any type of computerized code (not limited to QR Code) that conveys encrypted information associated with the document details. The computerized code may be transferred by audio/visual transmission/capture from the signor electronic device to the witness electronic device. Further, the transmission/capture of the QR code may indicate that the witness is in proximity to the signor and can actually view the document and the signor. Accordingly, the witness electronic device may capture the QR code presented on the signor electronic device. Further, it may also indicate that the signor has loaded the Document for Singing and has commenced the signing process. Furthermore, the QR code may load at specific times during the signature process. When employing two QR codes at, for example, two different times during the signature process, and requiring the witness to scan each QR code, the E-Signature platform can determine that the witness is in proximity to the signor throughout the different stages of the signature process.

Each time the QR Code loads, it may indicate document details, information for witness electronic device to access data associated with the document and the stage of the signature process during which the QR code was presented.

II. Platform Configuration

FIG. 1 is an illustration of a platform consistent with various embodiments of the present disclosure. By way of non-limiting example, the online platform 100 for facilitating electronic signing and witnessing of electronic signing may be hosted on a centralized server 110, such as, for example, a cloud computing service. The centralized server may communicate with other network entities, such as, for example, a mobile device (such as a smartphone, a laptop, a tablet computer etc.) and other electronic devices (such as desktop computers, etc.) over a communication network 112, such as, but not limited to, the Internet. Further, users of the platform may include one or more relevant parties such as, a requester of an electronic signature, a signor and one or more witnesses. Accordingly, electronic devices operated by the one or more relevant parties may be in communication with the platform. For example, the platform may be in communication with a signor electronic device 102 operated by the signor, a witness electronic device 104 operated by the witness and a requester electronic device 106 operated by the requester.

A user 105, such as the one or more relevant parties, may access platform 100 through a software application. The software application may be embodied as, for example, but not limited to, a website, a web application, a desktop application, and a mobile application compatible with a computing device 700. One possible embodiment of the software application may be provided by AdobeSign™ products and services. Accordingly, in an instance, the user 105 may be a requester of an electronic signing who may specify a document to be electronically signed, a signor ID of a signor who is required to provide an electronic signature, a witness ID of a witness (or a list of witnesses) who is required to witness the electronic signing of the document and so on. Further, in another instance, the user 105 may be the signor who may designate one or more witnesses by specifying corresponding one or more witness IDs.

Accordingly, in some embodiments, the platform may be embodied as a system for facilitating electronic signing of a document. The system may include a communication interface configured to receive a signature access request from a signor electronic device associated with a signor. Further, the communication interface may be configured to receive a first confirmation (for example, but not limited to, a signor ID confirmation) from a witness electronic device associated with a witness. Furthermore, the signor ID confirmation may be provided by the witness. Further, the communication interface may be configured to transmit the document to the signor electronic device based on the signor ID confirmation. Additionally, the signor electronic device may be configured to present the document to the signor and receive an electronic signature from the signor. Further, the communication interface may be configured to receive a second confirmation (for example, but not limited to, a signature confirmation) from the witness electronic device. Furthermore, the signature confirmation may be provided by the witness. Further, the communication interface may be configured to receive a signed document from the signor electronic device. Additionally, the signed document may include the electronic signature of the signor. Further, the electronic signature may be validated based on receipt of each of the first confirmation and the signature confirmation.

In some embodiments, the communication interface may be further configured to transmit a first code associated with the document to the signor electronic device. Further, the first code may include a document identifier associated with the document and a signor identifier associated with the signor. Furthermore, the first confirmation may be based on the first code. Additionally, the witness electronic device may be configured to receive the first code based on an interaction between the signor electronic device and the witness electronic device.

In some embodiments, the communication interface may be further configured to transmit a second code associated with the document to the signor electronic device. Further, the second code may include a signor identifier associated with the signor and the electronic signature of the signor. Furthermore, the signature confirmation may be based on the second code. Additionally, the witness electronic device may be configured to receive the second code based on an interaction between the signor electronic device and the witness electronic device.

In some embodiments, the communication interface may be further configured to receive one or more of: a) an image of the signor from the witness electronic device, wherein the image may be captured by the witness electronic device; b) an image of the signor from the witness electronic device, wherein the image may be captured by the signor electronic device, wherein the signor electronic device may be in one or more of a webcam session and a screen sharing session with the witness electronic device; c) a biometric feature of the signor from the witness electronic device, wherein the biometric feature may be captured by the witness electronic device; d) a scan of an identification card of the signor from the witness electronic device, wherein the scan may be captured by the witness electronic device; e) a scan of the signor from the witness electronic device, wherein the scan may be captured by the signor electronic device, wherein the signor electronic device may be in one or more of a webcam session and a screen sharing session with the witness electronic device.

In some embodiments, the system may further include a processor configured to generate an audit trail including audit data corresponding to at least one event associated with one or more of the signor electronic device, the witness electronic device and the platform (i.e., the system).

Further provided, is a system of facilitating witnessing of electronic signing of a document. The system may include a communication interface configured to receive a first confirmation from a witness electronic device associated with a witness. Further, the first confirmation may be provided by the witness. Furthermore, the first confirmation may be based on a first code presented on a signor electronic device. Additionally, the witness electronic device may be configured to receive the first code based on an interaction between the signor electronic device and the witness electronic device. Further, the communication interface may be configured to receive a second confirmation from the witness electronic device associated with a witness. Furthermore, the second confirmation may be provided by the witness. Moreover, the second confirmation may be based on a second code presented on the signor electronic device. Further, the witness electronic device may be configured to receive the second code based on an interaction between the signor electronic device and the witness electronic device. Additionally, the system may include a processor configured to establish witnessing of electronic signing of the document by the signor based on receipt of each of the first confirmation and the second confirmation.

In some embodiments, the communication interface may be further configured to receive a proximity indicator from one or more of the signor electronic device and the witness electronic device. Further, the proximity indicator may be generated based on proximity of the signor electronic device to the witness electronic device. Additionally, the communication interface may be further configured transmit an activation command to the witness electronic device based on the proximity of the witness to the signor. Further, the activation command may be configured to activate a scanner comprised in the witness electronic device. Furthermore, the scanner may be configured to capture one or more of the first code and the second code.

Figure 2:
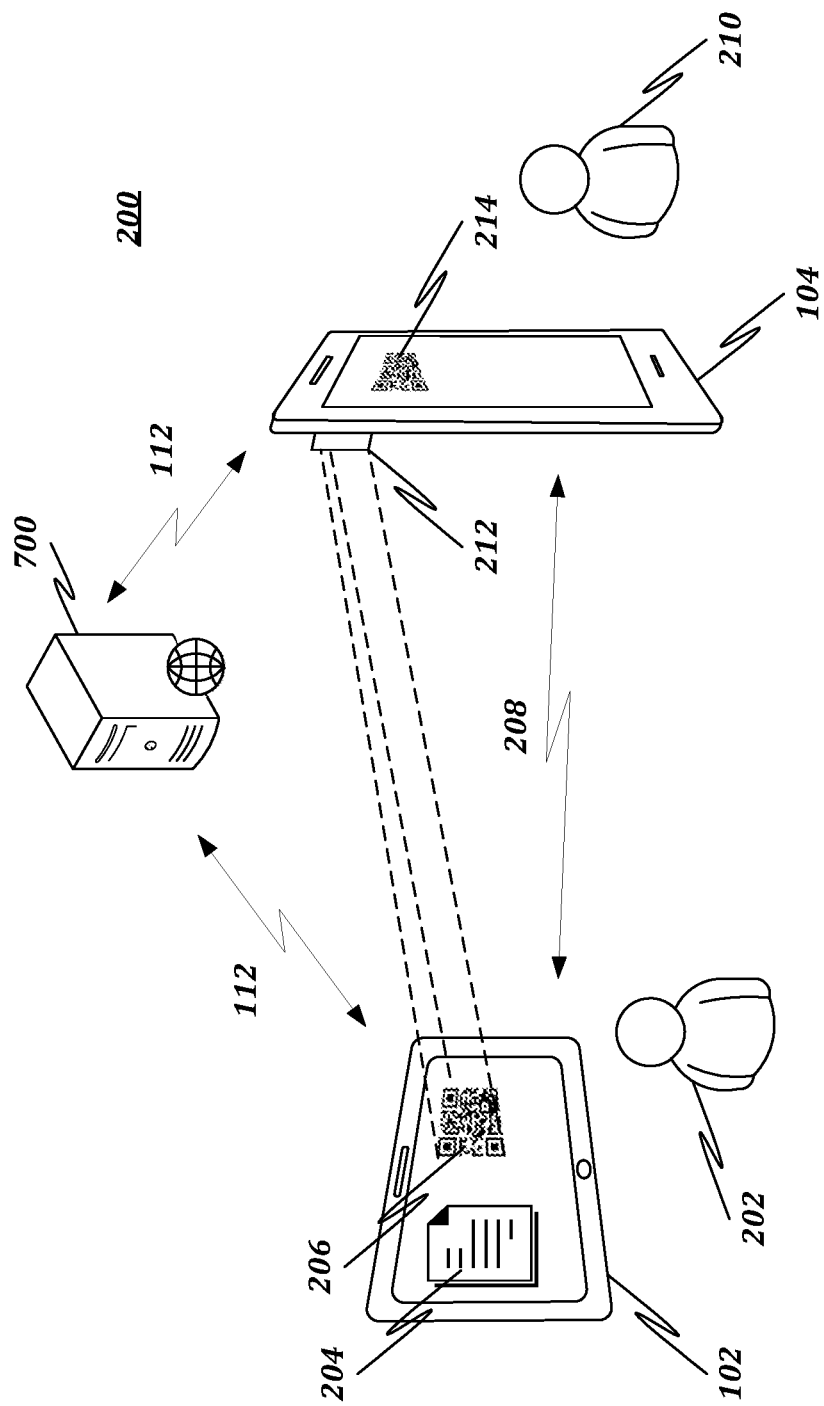
FIG. 2 illustrates operation of a system for facilitating electronic witnessing of electronic signing, in accordance with some embodiments.

Turning to FIG. 2, a system for facilitating electronic signing and witnessing of the electronic signing is illustrated, in accordance with some embodiments. As shown, each of the signor electronic device 102 and the witness electronic device 104 may be in communication with the E-signature platform 100 (i.e., the system) over the communication network 112 (such as for example, a long distance communication network). Further, the signor electronic device 102 may be operated by a signor 202. Accordingly, in order to obtain an electronic signature on a document 204, the document 204 may be presented to the signor 202 on the signor electronic device 102. Further, the platform may also transmit one or more QR codes (such as QR code 206) to be presented on the signor electronic device. Further, the one or more QR codes received by the signor electronic device 102 may be captured by the witness electronic device 104 through a number of techniques. For instance, the witness electronic device 104 may be in communication with the signor electronic device 102 over a communication channel 208 which may be a long distance communication network such as the Internet and/or a short range communication such as Bluetooth. Alternatively, the witness electronic device 104 may include a QR scanner 212 (or a camera) configured to optically capture the one or more QR codes presented on the signor electronic device 102. Accordingly, the witness 210 operating the witness electronic device 104 may be able to direct the witness electronic device 104 towards the signor electronic device 102 in order to capture the one or more QR codes. Further, subsequent to capturing the one or more QR codes, the witness electronic device 104 may notify the platform of the one or more QR codes captured. Accordingly, the platform may establish electronic witnessing by witness 210 of the electronic signing process performed by the signor 202.

For example, the platform may transmit a first QR code to the signor electronic device 102. Subsequently, the first QR code may be presented on a display device of the signor electronic device 102. Further, the witness 210 may capture the first QR code using the camera of the witness electronic device 104 resulting in a copy of the first QR code 214 being available on the witness electronic device 104. The first QR code may include information regarding the signor ID associated with the signor 202 and document detail regarding the document 204. The witness electronic device 104 may then notify the platform of the receipt of the copy of the first QR code 214. For instance, the witness electronic device 104 may transmit the copy of the first QR code 214 to the platform. Since the platform originally generated the first QR code, the platform may be enabled to validate the possession of the first QR code by the witness electronic device 104. In other words, the platform may establish that the witness electronic device 104 is in physical proximity of the signor electronic device 102. Therefore, it may be inferred that the witness 210 is in physical presence of the signor 202. Accordingly, a witnessing of one or more stages of the electronic signing process may be validated.

For instance, the first QR code may be used to validate the signor ID. In other words, by notifying the platform of the receipt of the copy of the QR code, the platform may establish that the witness validates an identity of the signor 202. Likewise, the platform may transmit a second QR code to the signor electronic device 102 subsequent to validation of the signor ID and during the electronic signing. Accordingly, the witness electronic device 104 may capture the second QR code and notify the platform. Therefore, by notifying the platform of the receipt of the copy of the second QR code, the platform may establish that the witness validates electronic signing of the document 204 by the signor 202.

Figure 3A:
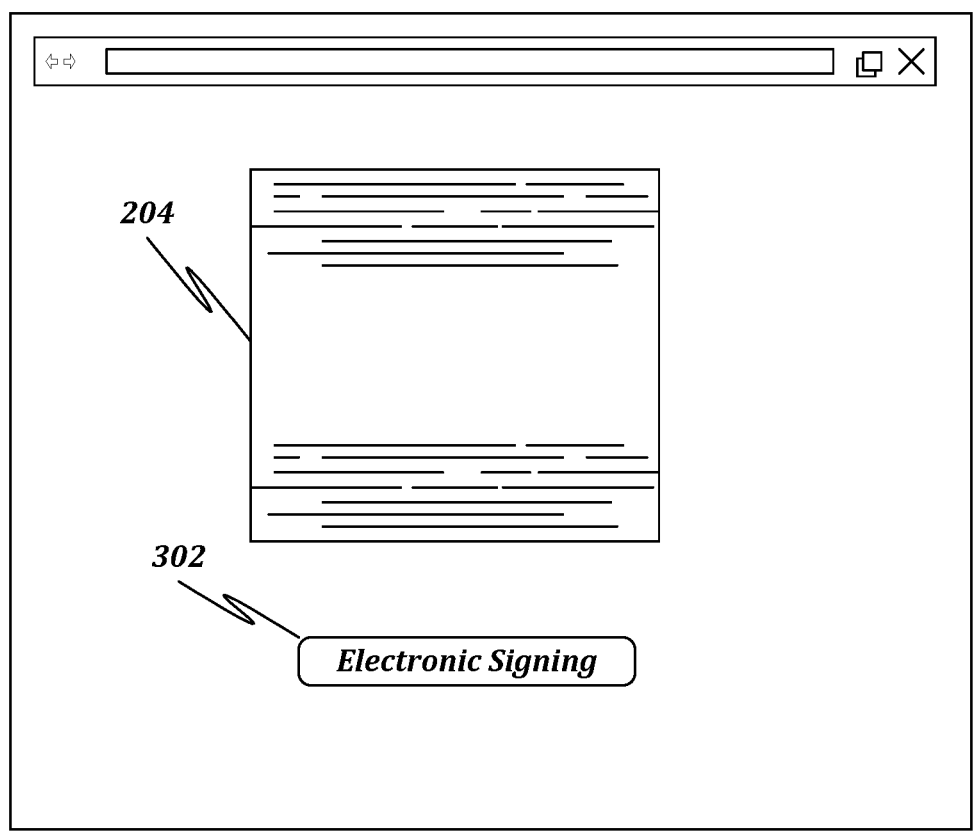
FIG. 3A illustrates a signor GUI presented to a signor of an electronic document for electronic signing, in accordance with some embodiments.

Turning now to FIG. 3A, a GUI 300A for facilitating electronic signing is illustrated, in accordance with some embodiments. The GUI 300A may be presented on the signor electronic device 102. Further, the GUI 300A may be configured to display the document 204 to the signor 202. Accordingly, subsequent to reviewing the document 204, the signor 202 may be enabled to provide an electronic signature by activating an electronic signing button 302 in the GUI 300A.

Figure 3B:
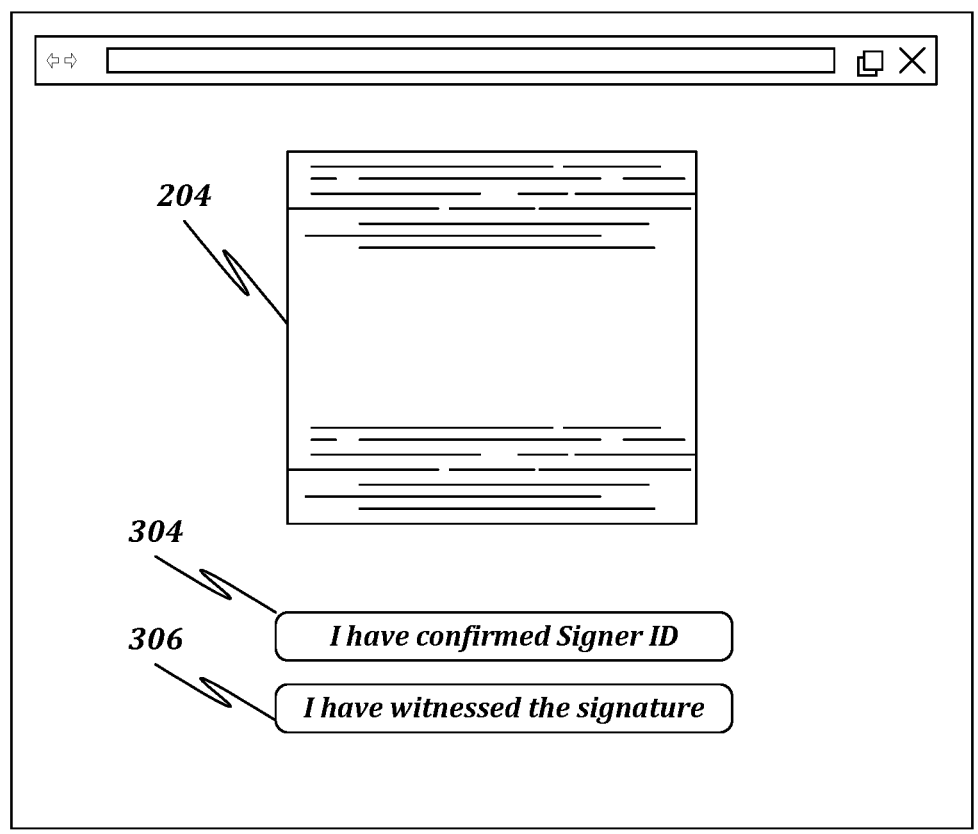
FIG. 3B illustrates a witness GUI presented to a witness of electronic signing of a document, in accordance with some embodiments.

Referring to FIG. 3B, a GUI 300B for facilitating electronic witnessing of electronic signing is illustrated, in accordance with some embodiments. The GUI 300B may be presented on the witness electronic device 104. Further, the GUI 300B may be configured to display the document 204 to the witness 210 along with the signor ID of the signor 202. Further, the GUI 300B may also provide one or more GUI elements (such as GUI elements 304 and 306) to confirm one or more of the signor ID and the electronic signing of the document 204.

Figure 4:
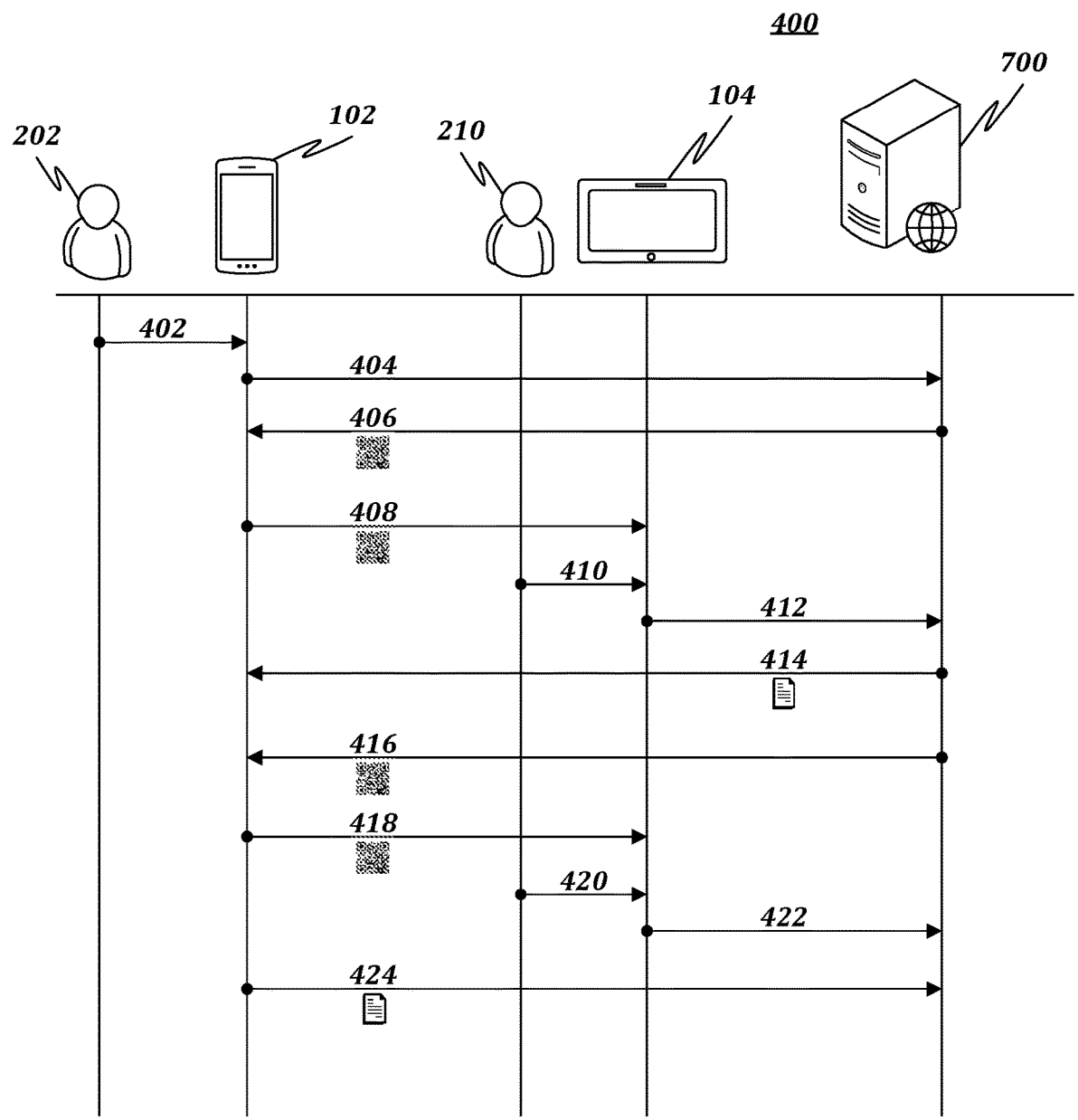
FIG. 4 illustrates a sequence diagram corresponding to a method of facilitating electronic witnessing of electronic signing of a document, in accordance with some embodiments.

FIG. 4 illustrates a sequence diagram corresponding to a method of facilitating electronic witnessing of electronic signing of a document, in accordance with some embodiments. At stage 402, the signor 202 may perform an action on the signor electronic device 102 in order to generate a request to perform electronic signing of a document. For instance, the action may be clicking a link previously transmitted to the signor electronic device by the platform 100. Based on the request, the platform 100 may transmit a first QR code to the signor electronic device 102 at stage 406. The first QR code may encode information regarding one or more of the document, signor ID of the signor 202, witness ID of the witness 210 and a requester ID of the requester of the electronic signing. Subsequently, at stage 408, the witness electronic device 104 may interact with the signor electronic device 102 in order to receive the first QR code. For example, a camera in the witness electronic device 104 may capture the first QR code displayed on a display of the signor electronic device 102. Accordingly, the first QR code may be decoded and information encoded in the first QR code may be displayed to the witness 210. As a result, the witness may be able to view one or more of the document, the signor ID of the signor 202, the witness ID of the witness 210 and the requester ID of the requester of the electronic signing. Subsequently, the witness 210 may perform a validation of the signor ID at stage 410 by interacting with a GUI (e.g., GUI 300B) on the witness electronic device 104. Accordingly, during stage 412, the witness electronic device 104 may transmit a notification to the platform 100 indicating verification of the signor ID by the witness 210. Subsequently, at stage 414, the platform 100 may transmit the document to the signor electronic device 102 for electronic signing. Further, at stage 416, the platform 100 may transmit a second QR code to the signor electronic device 102. Accordingly, during the electronic signing process, the second QR code may be displayed on the display of the signor electronic device 102. Further, while the electronic signing is in progress, the witness electronic device 104 may interact with the signor electronic device 102, at stage 418, in order to obtain the second QR code. Subsequently, at stage 420 the witness may interact with the GUI (such as GUI 300B) in order to validate the electronic signing process as being performed by the individual associated by the signor ID. Further at stage 422, the witness electronic device 104 may notify the platform 100 of the validation of the electronic signing. Thereafter, at stage 424, the platform 100 may receive the signed electronic document from the signor electronic device 102. Further, based on each of validation of signor ID and validation of electronic signing, the platform 100 may establish electronic witnessing of the electronic signing.

As will be detailed with reference to FIG. 7 below, the computing device through which the E-Signature platform may be accessed may comprise, but not be limited to, for example, a desktop computer, laptop, a tablet, or mobile telecommunications device. As will be detailed with reference to FIG. 7 below, the computing device through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

III. Platform Operation

Although methods 500 and 600 have been described to be performed by platform 100, it should be understood that computing device 700 may be used to perform the various stages of methods 500 and 600. Furthermore, in some embodiments, different operations may be performed by different networked elements in operative communication with computing device 700. For example, server 110 may be employed in the performance of some or all of the stages in methods 500 and 600. Moreover, server 110 may be configured much like computing device 700.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of methods 500 and 600 will be described in greater detail below.

Figure 5:
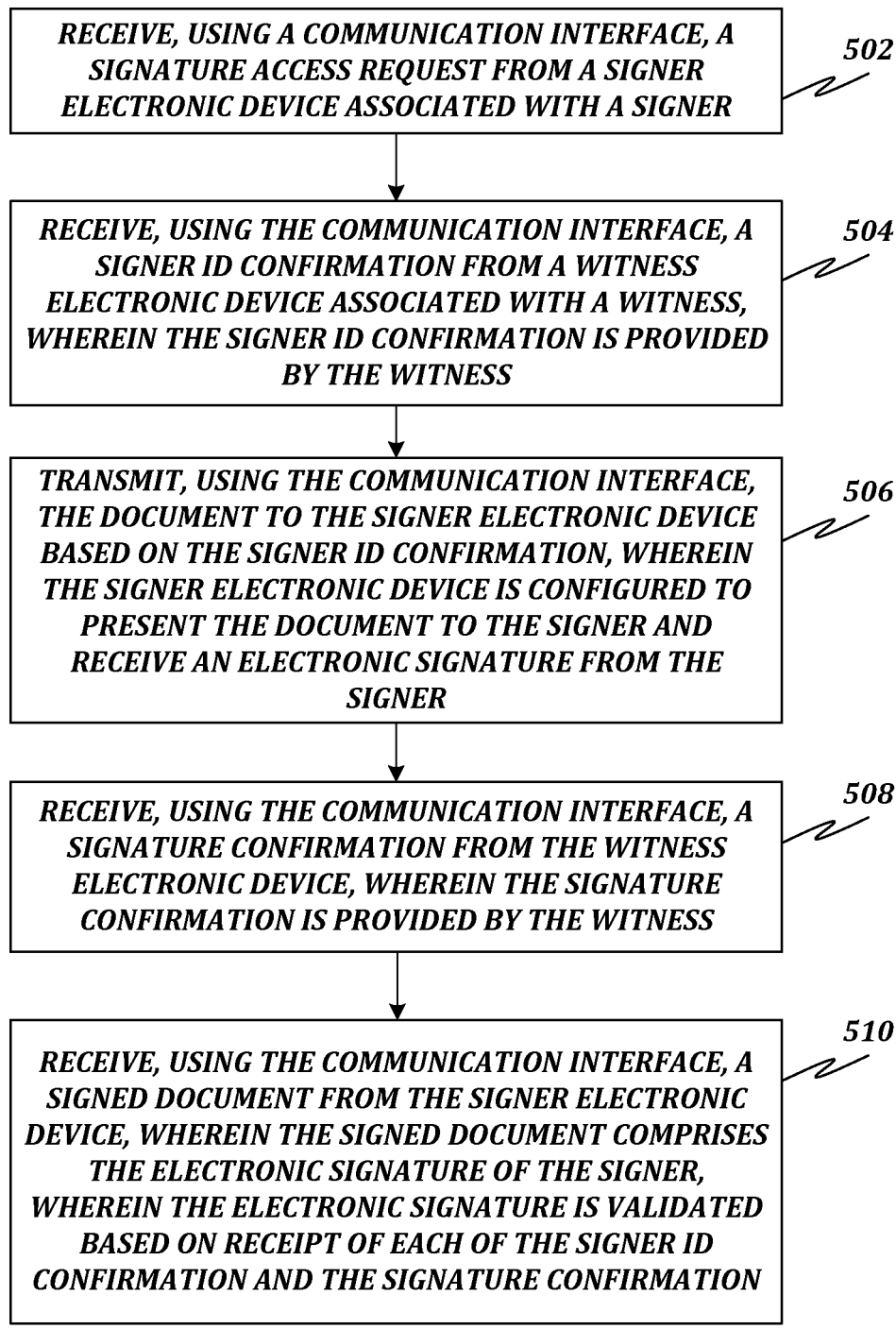
FIG. 5 illustrates a flowchart of a method of facilitating electronic signing of an electronic document, in accordance with some embodiments.

FIG. 5 illustrates a flowchart of a method 500 of facilitating electronic signing of an electronic document, in accordance with some embodiments. The method may include a stage 502 of receiving, using a communication interface, a signature access request from a signor electronic device associated with a signor. Further, the method may include a stage 504 of receiving, using the communication interface, a first confirmation from a witness electronic device associated with a witness. The first confirmation may be provided by the witness. Further, the method may include a stage 506 of transmitting, using the communication interface, the document to the signor electronic device based on the first confirmation. Furthermore, the signor electronic device may be configured to present the document to the signor and receive an electronic signature from the signor. Further, the method may include a stage 508 of receiving, using the communication interface, a second confirmation (for example, but not limited to, a signature confirmation) from the witness electronic device. The signature confirmation may be provided by the witness. Further, the method may include a stage 510 of receiving, using the communication interface, a signed document from the signor electronic device. Furthermore, the signed document may include the electronic signature of the signor. Additionally, the electronic signature may be validated based on receipt of each of the first confirmation and the signature confirmation.

In some embodiments, the method 500 may further include transmitting, using the communication interface, a first code associated with the document to the signor electronic device. Further, the first code may include a document identifier associated with the document and a signor identifier associated with the signor. Further, the first confirmation may be based on the first code. Further, the witness electronic device may be configured to receive the first code based on an interaction between the signor electronic device and the witness electronic device.

In some embodiments, the method 500 may further include transmitting, using the communication interface, a second code associated with the document to the signor electronic device. Further, the second code may include a signor identifier associated with the signor and the electronic signature of the signor. Further, the signature confirmation may be based on the second code. Further, the witness electronic device may be configured to receive the second code based on an interaction between the signor electronic device and the witness electronic device.

In some embodiments, the method 500 may further include receiving, using the communication interface, one or more of: an image of the signor from the witness electronic device. Further, the image may be captured by the witness electronic device; an image of the signor from the witness electronic device. Further, the image may be captured by the signor electronic device. Further, the signor electronic device may be in one or more of a web cam session and a screen sharing session with the witness electronic device; a biometric feature of the signor from the witness electronic device. Further, the biometric feature may be captured by the witness electronic device; a scan of an identification card of the signor from the witness electronic device. Further, the scan may be captured by the witness electronic device; a scan of the signor from the witness electronic device. Further, the scan may be captured by the signor electronic device. Further, the signor electronic device may be in one or more of a web cam session and a screen sharing session with the witness electronic device.

In some embodiments, the method 500 may further include generating, using a processor, an audit trail including audit data corresponding to at least one event associated with one or more of the signor electronic device and the witness electronic device.

FIG. 6 illustrates a flowchart of a method 600 of facilitating witnessing of electronic signing of an electronic document, in accordance with some embodiments. The method 600 may include a stage 602 of receiving, using the communication interface, a first confirmation (for example, but not limited to, a signor ID confirmation) from a witness electronic device associated with a witness. The signor ID confirmation may be provided by the witness. Further, the signor ID confirmation may be based on a first code presented on a signor electronic device associated with the signor. Furthermore, the witness electronic device may be configured to receive the first code based on an interaction between the signor electronic device and the witness electronic device. Additionally, the method may include a stage 604 of receiving, using the communication interface, a signature confirmation from the witness electronic device associated with a witness. The signature confirmation may be provided by the witness. Further, the signature confirmation may be based on a second code presented on the signor electronic device. Furthermore, the witness electronic device may be configured to receive the second code based on an interaction between the signor electronic device and the witness electronic device. Additionally, the method may include a stage 606 of establishing, using a processor, witnessing of electronic signing of the document by the signor based on receipt of each of the signor ID confirmation and the signature confirmation.

In some embodiments, the method 600 may further include receiving, using the communication interface, a proximity indicator from one or more of the signor electronic device and the witness electronic device. Further, the proximity indicator may be generated based on proximity of the signor electronic device to the witness electronic device. Additionally, the method 600 may include transmitting, using the communication interface, an activation command to the witness electronic device based on the proximity of the witness to the signor. Further, the activation command may be configured to activate a scanner comprised in the witness electronic device. Furthermore, the scanner may be configured to capture one or more of the first code and the second code.

A method of facilitating witnessing of electronic signing of a document, according to some embodiments. The method may include transmitting, using a communication interface, a document to a signor electronic device associated with a signor. Further, the signor electronic device may be configured to present the document to the signor and receive an electronic signature from the signor. Further, the method may include transmitting, using the communication interface, a unique code associated with the document to the signor electronic device. Further, the method may include transmitting, using a communication interface, a witness request to a witness electronic device associated with a witness. Further, the witness electronic device may be configured to interact with the signor electronic device. Further, the method may include receiving, using the communication interface, an attestment from the witness electronic device. Further, the attestment may validate authenticity of the electronic signature as belonging to the signor. Further, the attestment may include the unique code. Further, the witness electronic device may be configured to receive the unique code based on an interaction between the signor electronic device and the witness electronic device. Further, the method may include receiving, using the communication interface, a signed document from the signor electronic device. Further, the signed document may include the electronic signature of the signor.

In some embodiments, the method may further include receiving, using the communication interface, a signature request from a requester electronic device associated with a requester. Further, the signature request may include a document identifier associated with the document and one or more of a signor identifier associated with the signor and a witness identifier associated with the witness.

In some embodiments, the signature request further may include the document.

In some embodiments, the method may further include receiving, using the communication interface, a witness invite from the signor electronic device. Further, the witness invite may include a witness identifier associated with the witness.

In some embodiments, the witness invite further may include an email address of the witness and a witness passcode. Further, the witness passcode may be configured to facilitate authentication of the witness.

In some embodiments, the method may further include transmitting, using the communication interface, a list of certified witnesses to the signor electronic device. Further, the witness identifier may be selected from the list of certified witnesses.

In some embodiments, the method may further include: transmitting, using the communication interface, a signature request to the signor electronic device; and transmitting, using the communication interface, a witness request to the witness electronic device.

In some embodiments, the signature request may include a signature hyperlink. Further, the witness request may include a witness hyperlink.

In some embodiments, the method may further include: receiving, using the communication interface, a signor credential from the signor electronic device; and authenticating, using a processor, the signor based on the signor credential.

In some embodiments, the method may further include: receiving, using the communication interface, a witness credential from the witness electronic device; and authenticating, using a processor, the witness based on the witness credential.

In some embodiments, the unique code may include a code configured to be displayed on the signor electronic device.

In some embodiments, the code may include a first Quick Response (QR code including one or more of a document identifier associated with the document, the document, a signor identifier associated with the signor, a requester identifier associated with a requester.

In some embodiments, the method may further include receiving, using the communication interface, an image of the signor from the witness electronic device. Further, the image may be captured by the witness electronic device.

In some embodiments, the method may further include receiving, using the communication interface, an image of the signor from the witness electronic device. Further, the image may be captured by the signor electronic device. Further, the signor electronic device may be in one or more of a webcam session and a screen sharing session with the witness electronic device.

In some embodiments, the method may further include receiving, using the communication interface, a biometric feature of the signor from the witness electronic device. Further, the biometric feature may be captured by the witness electronic device.

In some embodiments, the method may further include receiving, using the communication interface, a scan of an identification card of the signor from the witness electronic device. Further, the scan may be captured by the witness electronic device.

In some embodiments, the method may further include receiving, using the communication interface, a scan of the signor from the witness electronic device. Further, the scan may be captured by the signor electronic device. Further, the signor electronic device may be in one or more of a webcam session and a screen sharing session with the witness electronic device.

In some embodiments, the method may further include, receiving, using the communication interface, a signor ID confirmation from the witness electronic device. Further, the signor ID confirmation may be provided by the witness.

In some embodiments, the code may include a second Quick Response (QR code including one or more of a document identifier associated with the document, the document, a signor identifier associated with the signor, the electronic signature of the signor and the signed document.

In some embodiments, the method may further include receiving, using the communication interface, a signor ID confirmation from the witness electronic device. Further, the signor ID confirmation may be provided by the witness.

In some embodiments, the method may further include receiving, using the communication interface, a signature confirmation from the witness electronic device. Further, the signature confirmation may be provided by the witness.

In some embodiments, the method may further include receiving, using the communication interface a proximity indicator from one or more of the signor electronic device and the witness electronic device. Further, the proximity indicator may be generated based on proximity of the signor electronic device to the witness electronic device.

In some embodiments, the proximity indicator may be generated based on a near field communication between the signor electronic device and the witness electronic device.

In some embodiments, the method may further include: receiving, using the communication interface, each of a signor location associated with the signor electronic device and a witness location associated with the witness electronic device; comparing, using a processor, the signor location with the witness location; and determining, using the processor, a proximity of the witness to the signor based on a result of the comparing.

In some embodiments, the method may further include activating a scanner comprised in the witness electronic device based on the proximity of the witness to the signor.

In some embodiments, the scanner may include an optical scanner configured to scan a Quick Response (QR) code.

In some embodiments, the method may further include receiving, using the communication interface, a proximity requirement from a requester electronic device associated with a requester.

In some embodiments, each of the signor location and the witness location may be based on one or more of a GPS location and a WiFi Location.

In some embodiments, the method may further include generating, using a processor, an audit trail including audit data corresponding to at least one event associated with one or more of the signor electronic device and the witness electronic device.

Further disclosed is a method of establishing witnessing of electronic signing of a document, in accordance with some embodiments. The method may include receiving, using a communication interface, a signature request from a requester electronic device associated with a requester. Further, the signature request may include a document identifier associated with a document and one or more of a signor identifier associated with the signor and a witness identifier associated with the witness. Further, the method may include transmitting, using the communication interface, the document to a signor electronic device associated with the signor. Further, the signor electronic device may be configured to present the document to the signor and receive an electronic signature from the signor. Further, the method may include transmitting, using the communication interface, a first Quick Access (QR) code to the signor electronic device. Further, the QR code may include each of the document identifier, the signor identifier and a requester identifier associated with the requester; receiving, using the communication interface, a first notification from the witness electronic device. Further, the first notification may be generated based on capturing of the first QR code by the witness electronic device; receiving, using the communication interface, a signor ID confirmation from the witness electronic device. Further, the signor ID confirmation may be provided by the witness; transmitting, using the communication interface, a second QR code including a link to each of the electronic signature of the signor and the signed document; receiving, using the communication interface, a second notification from the witness electronic device. Further, the second notification may be generated based on capturing of the second QR code by the witness electronic device; receiving, using the communication interface, a signature confirmation from the witness electronic device. Further, the signature confirmation may be provided by the witness; receiving, using the communication interface, the signed document from the signor electronic device. Further, the signed document may include the electronic signature of the signor; and establishing, using the processor, witnessing of electronic signing of the document based on each of the first notification, the signature ID confirmation, the second notification, the signature confirmation and receipt of the signed document.

IV. Platform Architecture

The platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform 100 may be hosted on a centralized server, such as, for example, a cloud computing service. Although methods 500 and 600 have been described to be performed by a computing device 700, it should be understood that, in some embodiments, different operations may be performed by different networked elements in operative communication with computing device 700.

Embodiments of the present disclosure may comprise a system having a memory storage and a processing unit. The processing unit coupled to the memory storage, wherein the processing unit is configured to perform the stages of methods 500 and 600.

Figure 7:
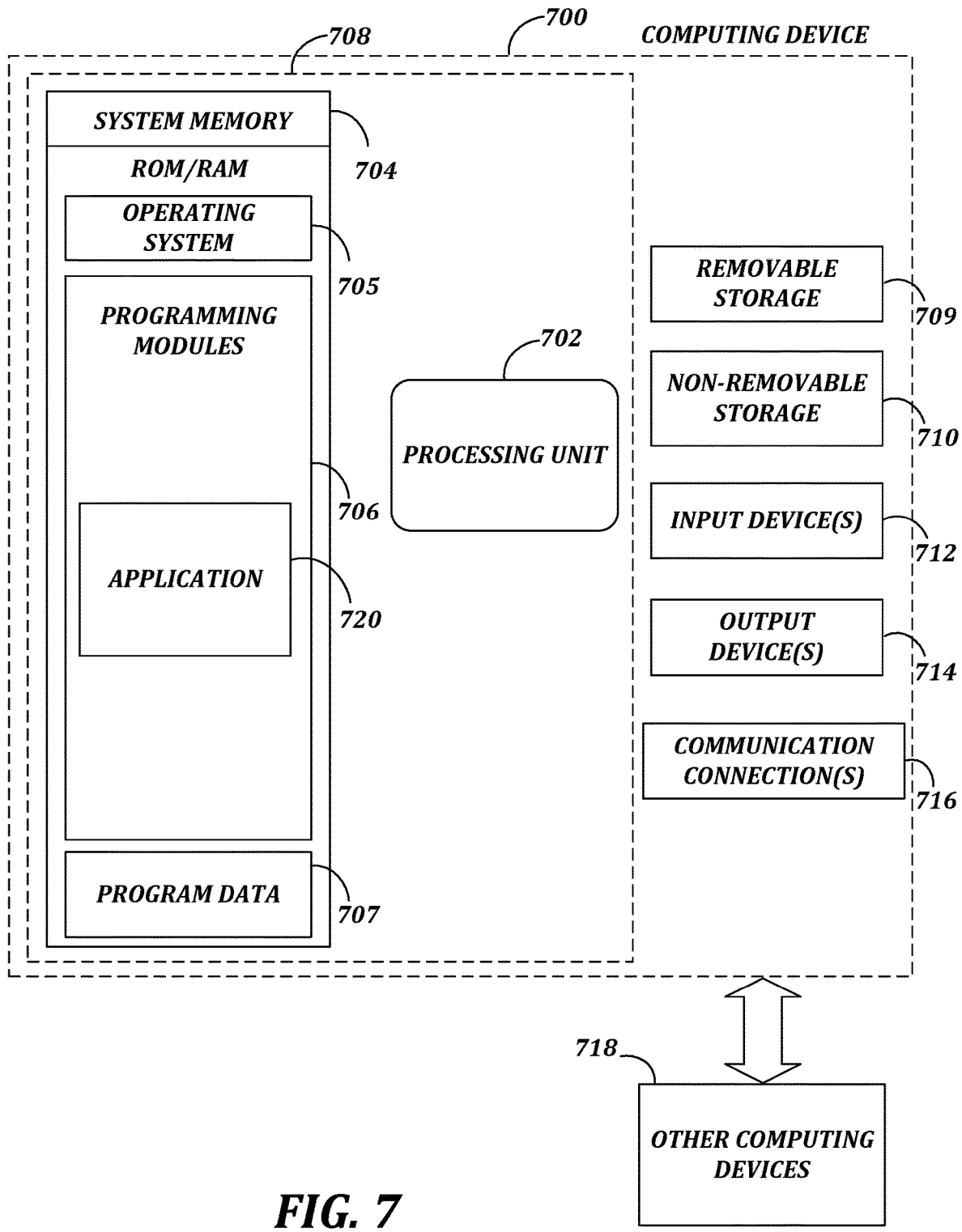
FIG. 7 illustrates a block diagram of a system for facilitating serving of an order at a facility, in accordance with some embodiment.

FIG. 7 is a block diagram of a system including computing device 700. Consistent with an embodiment of the disclosure, the aforementioned memory storage and processing unit may be implemented in a computing device, such as computing device 700 of FIG. 7. Any suitable combination of hardware, software, or firmware may be used to implement the memory storage and processing unit. For example, the memory storage and processing unit may be implemented with computing device 700 or any of other computing devices 718, in combination with computing device 700. The aforementioned system, device, and processors are examples and other systems, devices, and processors may comprise the aforementioned memory storage and processing unit, consistent with embodiments of the disclosure.

With reference to FIG. 7, a system consistent with an embodiment of the disclosure may include a computing device or cloud service, such as computing device 700. In a basic configuration, computing device 700 may include at least one processing unit 702 and a system memory 704. Depending on the configuration and type of computing device, system memory 704 may comprise, but is not limited to, volatile (e.g., random access memory (RAM)), non-volatile (e.g., read-only memory (ROM)), flash memory, or any combination. System memory 704 may include operating system 705, one or more programming modules 706, and may include a program data 707. Operating system 705, for example, may be suitable for controlling computing device 700's operation. In one embodiment, programming modules 706 may include image encoding module, machine learning module and image classifying module. Furthermore, embodiments of the disclosure may be practiced in conjunction with a graphics library, other operating systems, or any other application program and is not limited to any particular application or system. This basic configuration is illustrated in FIG. 7 by those components within a dashed line 708.

Computing device 700 may have additional features or functionality. For example, computing device 700 may also include additional data storage devices (removable and/or non-removable) such as, for example, magnetic disks, optical disks, or tape. Such additional storage is illustrated in FIG. 7 by a removable storage 709 and a non-removable storage 710. Computer storage media may include volatile and nonvolatile, removable and non-removable media implemented in any method or technology for storage of information, such as computer readable instructions, data structures, program modules, or other data. System memory 704, removable storage 709, and non-removable storage 710 are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 700. Any such computer storage media may be part of device 700. Computing device 700 may also have input device(s) 712 such as a keyboard, a mouse, a pen, a sound input device, a touch input device, etc. Output device(s) 714 such as a display, speakers, a printer, etc. may also be included. The aforementioned devices are examples and others may be used.

Computing device 700 may also contain a communication connection 716 that may allow device 700 to communicate with other computing devices 718, such as over a network in a distributed computing environment, for example, an intranet or the Internet. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 704, including operating system 705. While executing on processing unit 702, programming modules 706 (e.g., application 720) may perform processes including, for example, stages of one or more of methods 500 and 600 as described above. The aforementioned process is an example, and processing unit 702 may perform other processes. Other programming modules that may be used in accordance with embodiments of the present disclosure may include image encoding applications, machine learning application, image classifiers etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

V. Aspects

The following disclose various Aspects of the present instructions for executing a computer process. The computer disclosure. The various Aspects are not to be construed as patent aspects unless the language of the Aspect appears as a patent aspect. The Aspects describe various non-limiting embodiments of the present disclosure.

Aspect 1. A method of facilitating electronic signing of a document, the method comprising:
   receiving an indication of a signature access request from a signor electronic device associated with a signor;
   receiving a first confirmation from a witness electronic device associated with a witness, wherein receiving the first confirmation comprises receiving a first code comprising a document identifier associated with the document and a signor identifier associated with the signor, the first code being received based on an interaction between the witness electronic device and the signor electronic device;
   enabling the electronic signing of the document to the signor electronic device based on the first confirmation, wherein the signor electronic device is configured to present the document to the signor and receive an electronic signature from the signor;
   receiving a second confirmation from the witness electronic device; and
   receiving an indication of a signed document, wherein the signed document comprises the electronic signature of the signor.

Aspect 2. The method of aspect 1, further comprising: receiving a second code comprising the signor identifier associated with the signor and the electronic signature of the signor, wherein the second confirmation is based on the second code, wherein receiving the second code comprises receiving the second code associated with an interaction between the signor electronic device and the witness electronic device.

Aspect 3. The method of aspect 1, further comprising; receiving at least one of the following:
   an image of the signor from the witness electronic device, wherein the image is captured by the witness electronic device,
   an image of the signor from the witness electronic device, wherein the image is captured by the signor electronic device, wherein the signor electronic device is in at least one of the following: a webcam session and a screen sharing session with the witness electronic device,
   a biometric feature of the signor from the witness electronic device, wherein the biometric feature is captured by the witness electronic device,
   a scan of an identification card of the signor from the witness electronic device, wherein the scan is captured by the witness electronic device, and
   a scan of the signor from the witness electronic device, wherein the scan is captured by the signor electronic device, wherein the signor electronic device is in at least one of the following: the webcam session and the screen sharing session with the witness electronic device.

Aspect 4. The method of aspect 1, further comprising generating, using a processor, an audit trail comprising audit data corresponding to at least one event associated with at least one of the following: the signor electronic device and the witness electronic device.

Aspect 5. A method of facilitating witnessing of electronic signing of a document by a signor, the method comprising:
   receiving a first confirmation from a witness electronic device associated with a witness,
   wherein receiving the first confirmation comprising receiving an indication the witness is to attest an execution of the document by the signor and that the first confirmation is based on a first code that is transmitted in response to an interaction of the witness electronic device with at least one of the following: the signor and a signor electronic device;
   making the document available for execution to the signor electronic device;
   receiving a second confirmation from the witness electronic device, wherein the second confirmation is provided in response to a completion of the electronic signing of the document; and
   establishing witnessing of the electronic signing of the document by the signor based on receipt of each of the following: the first confirmation and the second confirmation.

Aspect 6. The method of aspect 5, wherein receiving the first confirmation comprises:
   receiving a proximity indicator from at least one of the signor electronic device and the witness electronic device, wherein the proximity indicator is generated based on proximity of the signor electronic device to the witness electronic device, and
   transmitting an activation command to the witness electronic device based on the proximity of the witness electronic device to the signor electronic device, wherein the activation command is configured to activate a scanner comprised in the witness electronic device, wherein the scanner is configured to capture the first code.

Aspect 7. A system for facilitating electronic signing of a document, the system comprising:
   a memory storage; and
   a processing unit coupled to the memory storage, wherein the processing unit is configured to:
      receive an indication that a witness is to attest an execution of the document by a signor using a signor electronic device,
      receive a first confirmation from a witness electronic device associated with the witness, wherein the first confirmation comprises a document identifier associated with the document and a signor identifier associated with the signor, wherein the first confirmation is based on a first code associated with an interaction between the signor electronic device and the witness electronic device,
      enable the electronic signing of the document to the signor electronic device based on the first confirmation, wherein the signor electronic device is configured to present the document to the signor and receive an electronic signature from the signor, receive a second confirmation from the witness electronic device, and validate the electronic signing based on, at least in part, receipt of each of the first confirmation and the second confirmation.

Aspect 8. The system of aspect 7, wherein the processing unit is further configured to transmit a second code associated with the document to the signor electronic device, wherein the second confirmation is based on the second code.

Aspect 9. The system of aspect 7, wherein the processing unit is further configured to receive at least one of the following:

an image of the signor from the witness electronic device, wherein the image is captured by the witness electronic device, an image of the signor from the witness electronic device, wherein the image is captured by the signor electronic device, wherein the signor electronic device is in at least one of the following: a webcam session and a screen sharing session with the witness electronic device, a biometric feature of the signor from the witness electronic device, wherein the biometric feature is captured by the witness electronic device, a scan of an identification card of the signor from the witness electronic device, wherein the scan is captured by the witness electronic device, and a scan of the signor from the witness electronic device, wherein the scan is captured by the signor electronic device, wherein the signor electronic device is in at least one of the following: the webcam session and the screen sharing session with the witness electronic device.

Aspect 10. The system of aspect 7, wherein the processing unit is configured to generate an audit trail comprising audit data corresponding to at least one event associated with at least one of the following: the signor electronic device and the witness electronic device.

Aspect 11. A system of facilitating witnessing of electronic signing of a document, the system comprising:

a memory storage; and a processing unit coupled to the memory storage, wherein the processing unit is configured to:

receive a first confirmation from a witness electronic device associated with a witness, wherein the first confirmation is based on a first code made available on a signor electronic device, wherein the witness electronic device is configured to receive the first code based on a first interaction between the signor electronic device and the witness electronic device, enable the electronic signing of the document by the signor electronic device, and receive a second confirmation from the witness electronic device associated with the witness, wherein the second confirmation is provided by the witness, wherein the second confirmation is based on a second code made available on the signor electronic device, wherein the witness electronic device is configured to receive the second code based on a second interaction between the signor electronic device and the witness electronic device.

Aspect 12. The system of aspect 11, wherein the processing unit is further configured to:

receive a proximity indicator from at least one of the signor electronic device and the witness electronic device, wherein the proximity indicator is generated based on proximity of the signor electronic device to the witness electronic device; and transmit an activation command to the witness electronic device based on the proximity of the witness electronic device to the signor electronic device, wherein the activation command is configured to activate a scanner comprised in the witness electronic device, wherein the scanner is configured to capture at least one of the following: the first code and the second code.

Aspect 13. A non-transient computer readable medium comprising program code for facilitating electronic signing of a document, wherein execution of the program code by a processor cause the processor to:

receive a signature access request from a signor electronic device associated with a signor;

receive a first confirmation from a witness electronic device associated with a witness, wherein the first confirmation is based on a first code, wherein the first code is associated with an interaction between the signor electronic device and the witness electronic device;

transmit the document to the signor electronic device based on the first confirmation, wherein the signor electronic device is configured to present the document to the signor and receive an electronic signature from the signor;

receive a second confirmation from the witness electronic device; and validate the electronic signature based on receipt of each of the following: the first confirmation and the second confirmation.

Aspect 14. The non-transient computer readable medium of aspect 13, wherein the program code further comprises instructions executable by the processor to cause the processor to receiving the second confirmation comprising a second code, wherein the second code is associated with a subsequent interaction between the signor electronic device and the witness electronic device.

Aspect 15. The non-transient computer readable medium of aspect 13, wherein the program code further comprises instructions executable by the processor to cause the communication interface to receive at least one of:

an image of the signor from the witness electronic device, wherein the image is captured by the witness electronic device;

an image of the signor from the witness electronic device, wherein the image is captured by the signor electronic device, wherein the signor electronic device is in at least one of the following: a webcam session and a screen sharing session with the witness electronic device;

a biometric feature of the signor from the witness electronic device, wherein the biometric feature is captured by the witness electronic device;

a scan of an identification card of the signor from the witness electronic device, wherein the scan is captured by the witness electronic device; and a scan of the signor from the witness electronic device, wherein the scan is captured by the signor electronic device, wherein the signor electronic device is in at least one of the following: the webcam session and the screen sharing session with the witness electronic device.

Aspect 16. The non-transient computer readable medium of aspect 13, wherein the program code further comprises instructions executable by the processor to cause the processor to generate an audit trail comprising audit data corresponding to at least one event associated with at least one of the signor electronic device and the witness electronic device.

Aspect 17. A non-transient computer readable medium comprising program code for facilitating witnessing of electronic signing of a document, wherein execution of the program code by a processor causes the processor to:

receive a specification of a witness identifier;

communicate data to an address associated with the witness identifier;

establish communication with a witness electronic device associated with the witness identifier;

receive a first confirmation from the witness electronic device, the first confirmation being associated with a code comprising a document identifier associated with the document and a signor identifier associated with the signor, wherein the first confirmation is received in response to an interaction between a signor electronic device and the witness electronic device;

enable the document for the electronic signing; and receive a second confirmation from the witness electronic device, wherein the second confirmation is provided in response to a completion of the electronic signing of the document; and establish witnessing of the electronic signing of the document by the signor based on receipt of each of the following: the first confirmation and the second confirmation.

Aspect 18. A method of facilitating electronic signing of a document, the method comprising:

receiving an indication of a signature access request from a signor electronic device associated with a signor;

receiving a first confirmation from a witness electronic device associated with a witness;

enabling the electronic signing of the document to the signor electronic device based on the first confirmation, wherein the signor electronic device is configured to present the document to the signor and receive an electronic signature from the signor;

receiving a second confirmation from the witness electronic device, wherein receiving the second confirmation comprises receiving a second code comprising a signor identifier associated with the signor and the electronic signature of the signor, the second code being received based on an interaction between the signor electronic device and the witness electronic device; and receiving an indication of a signed document, wherein the signed document comprises the electronic signature of the signor.

Aspect 19. The method of aspect 18, wherein receiving the first confirmation comprises: receiving a second code comprising the document identifier associated with the document and the signor identifier associated with the signor.

VI. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A method, comprising:
transmitting an electronic document for electronic signature, the electronic document requiring a witness with one or more witness qualifications to verify one or more signor identification parameters;
specifying a witness selected to verify at least one of the one or more signor identification parameters;
determining that the witness meets the one or more witness qualifications;
transmitting, to the witness, at least an indicator of the signor identification parameters to be verified;
receiving an indication that the witness has verified at least one signor identification parameter of the one or more identification parameters from the signor identification parameters; and
responsive to receiving the indication that the witness meets the one or more witness qualifications and the indication that the witness has verified the at least one identification parameter, enabling the electronic document for electronic signature.

2. The method of claim 1, wherein enabling the electronic document for electronic signature comprises transmitting a uniform resource locator (URL) associated with the electronic document to a signor for electronic signature.

3. The method of claim 1, wherein receiving the indication that the witness has verified at least one of the one or more identification parameters further comprises receiving an attestation from the witness indicating that the witness verified the at least one of the one or more identification parameters.

4. The method of claim 1, wherein receiving the indication that the witness has verified the at least one identification parameter comprises:
receiving location information associated with the witness; and
wherein determining that the witness satisfies the one or more witness qualification comprises determining that distance between the witness and the signor is less than a threshold distance.

5. The method of claim 1, wherein the indication that the witness has verified the at least one signor identification parameter comprises one or more of a picture, biometric information, or information associated with an identification card to confirm an identity of a signor.

6. The method of claim 1, wherein transmitting the indication of the signor identification parameters comprises transmitting the indication of the signor identification parameters in response to verifying that the witness meets the one or more witness qualifications.

7. The method of claim 1, further comprising transmitting, to the witness, a uniform resource locator (URL), and wherein receiving the indication of the witness qualifications comprises receiving the indication based on the witness accessing the URL.

8. A method, comprising:
receiving a specification of one or more witness qualifications from a requestor indication of initiation of an electronic signature process for an electronic document, the electronic document requiring a witness to verify one or more signor identification parameters;
transmitting, to the signor, the electronic document with an indication of the one or more witness qualifications, wherein the witness must meet the one or more witness qualifications;
receiving a specification of contact information associated with a witness to verify at least one of the one or more identification parameters;

verifying based on the witness qualifications, that the witness meets the one or more witness qualifications prior to providing the electronic document to the signor;

transmitting, to the witness, an indication associated with the one or more signor identification parameters to be verified;

receiving an indication that the witness has verified the one or more signor identification parameters; and responsive to receiving the indication that the witness has verified the one or more signor identification parameters, enabling the electronic document to a signor for electronic signature.

9. The method of claim 8, wherein receiving the indication that the witness has verified the one or more signor identification parameters comprises receiving an attestation from the witness indicating that the witness verified the one or more signor identification parameters.

10. The method of claim 8, wherein receiving the indication that the witness has verified the one or more signor identification parameters comprises:

receiving location information associated with the witness; and wherein determining that the witness satisfies the one or more witness qualification comprises determining that a distance between the witness and the signor is less than a threshold distance.

11. The method of claim 8, wherein the indication that the witness has verified the one or more signor identification parameters comprises one or more of a picture, biometric information, or information associated with an identification card to confirm an identity of the signor.

12. The method of claim 8, wherein transmitting the indication of the one or more signor identification parameters comprises transmitting the one or more signor identification parameters in response to verifying that the witness meets the one or more witness qualifications.

13. The method of claim 8, further comprising transmitting, to the witness, a uniform resource locator (URL), and wherein receiving the indication of the signor identification parameters comprises receiving the indication in response to the witness accessing the URL.

14. A method comprising:

providing an indication of one or more witness qualifications, wherein a witness to an electronic document must satisfy the one or more witness qualifications;

receiving an indication of a witness to verify at least one of an one or more signor identification parameters;

transmitting, to the witness, in response to the indication of the witness, the at least one of the one or more signor identification parameters to be verified;

receiving an indication that the witness has verified the at least of the one or more signor identification parameters from the signor identification parameters;

determining, based on the indication that the witness has verified the at least one of the one or more signor identification parameters, that the witness satisfies the one or more witness qualifications; and responsive to receiving the indication that the witness has verified the at least one of the one or more signor identification parameters and determining that the witness satisfies the one or more witness qualifications, making the electronic document available for electronic signature.

15. The method of claim 14, wherein receiving the indication that the witness has verified the at least one of the one or more signor identification parameters comprises receiving an attestation from the witness indicating that the witness verified the at least one of the one or more signor identification parameters.

16. The method of claim 14, wherein receiving the indication that the witness has verified the at least one identification parameter comprises:

receiving location information associated with the witness; and wherein determining that the witness satisfies the one or more witness qualifications comprises determining that a distance between the witness and a signor is less than a threshold distance.

17. The method of claim 14, wherein the indication that the witness has verified the at least one identification parameter comprises one or more of a picture, biometric information, or information associated with an identification card to confirm an identity of a signor.

18. The method of claim 14, wherein making the electronic document available for electronic signature comprises transmitting a uniform resource locator (URL) associated with the electronic document to a signor for electronic signature.

19. The method of claim 14, further comprising transmitting, to the witness, a uniform resource locator (URL), and wherein receiving the indication that the witness has verified the at least of the one or more signor identification parameters comprises receiving the indication that the witness has verified the at least of the one or more signor identification parameters based on the witness accessing the URL.

\* \* \* \* \*